(12) United States Patent
Kim et al.

(10) Patent No.: US 10,336,170 B2
(45) Date of Patent: Jul. 2, 2019

(54) VARIABLE BELT MOLDING STRUCTURE FOR VEHICLE DOOR

(71) Applicants: Hyundai Motor Company, Seoul (KR); Kia Motors Corporation, Seoul (KR)

(72) Inventors: Dae Chul Kim, Busan (KR); Eui Chan Cho, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 83 days.

(21) Appl. No.: 15/661,952

(22) Filed: Jul. 27, 2017

(65) Prior Publication Data

US 2018/0162209 A1   Jun. 14, 2018

(30) Foreign Application Priority Data

Dec. 13, 2016   (KR) .................. 10-2016-0169843

(51) Int. Cl.
*B60J 10/78*   (2016.01)
*B60J 10/32*   (2016.01)

(52) U.S. Cl.
CPC .............. *B60J 10/78* (2016.02); *B60J 10/32* (2016.02)

(58) Field of Classification Search
CPC .................................. B60J 10/78; B60J 10/32
See application file for complete search history.

(56) References Cited

U.S. PATENT DOCUMENTS

2009/0223135 A1* 9/2009 Bocutto ................. B60J 10/235
49/493.1

FOREIGN PATENT DOCUMENTS

| JP | 2003-500282 A | 1/2003 |
| JP | 2007-137144 A | 6/2007 |
| KR | 10-2007-0040487 A | 4/2007 |

* cited by examiner

*Primary Examiner* — D Glenn Dayoan
*Assistant Examiner* — Melissa A Black
(74) *Attorney, Agent, or Firm* — Morgan, Lewis & Bockius LLP

(57) ABSTRACT

A variable belt molding structure for a vehicle door, may include a skin disposed in a fixed quarter window and a rear door window formed in a rear door of a vehicle to have a width that is varied in a longitudinal direction; a carrier portion internally coupled to the skin to maintain air-tightness by being in contact with a window glass of the rear door window; a clip mounted to be internally coupled to the carrier portion and mounted in a door panel of the rear door; and a mounting clip coupled to a fixed quarter window bracket attached to the fixed quarter window.

9 Claims, 6 Drawing Sheets

VARIABLE BELT MOLDING STRUCTURE FOR VEHICLE DOOR

CROSS-REFERENCE(S) TO RELATED APPLICATIONS

The present application claims priority to Korean Patent Application No. 10-2016-0169843 filed on Dec. 13, 2016, the entire contents of which are incorporated herein for all purposes by this reference.

BACKGROUND OF THE INVENTION

Field of the Invention

The present invention relates to a belt molding structure for a vehicle door, and more particularly, to a variable belt molding structure for a vehicle door having a variable width and disposed in a belt line of a rear door of a vehicle.

Description of Related Art

A vehicle door conventionally includes a window opening for selectively exposing an inside of the vehicle to the outside environment, and a window glass for opening or closing the window opening is disposed and configured to vertically move in a height direction of the vehicle.

The vehicle door further includes: a seal including a sealing rib for maintaining air-tightness by being in close contact with the window glass which moves up and down through the window opening, and a molding coupled thereto together with the seal and mounted in a door panel along a frame of the window opening to improve an appearance of the vehicle door.

The molding disposed along a lower frame of the window opening is referred to as a belt molding.

FIG. 1 is a perspective view illustrating a state in which a vehicle door belt molding is mounted in a rear door 100 of the vehicle according to the prior art. A rear door window 110 is formed in the rear door 100 of the vehicle, and a rear door belt molding 120 is mounted along a lower edge of the rear door window 110 in the rear door 100.

In addition, a fixed quarter window 130 that is not openable is mounted in the rear door 100, a fixed quarter molding 140 is mounted along a frame of the fixed quarter window 130 in the rear door 100, and a variable molding 150 having a variable width is mounted between the rear door belt molding 120 and the fixed quarter molding 140 in the rear door 100.

However, since the rear door belt molding 120 and the variable molding 150 are separately manufactured and mounted in a conventional belt molding structure for a vehicle door, assembly scattering may be generated at a boundary part therebetween, thereby deteriorating an appearance of the vehicle door.

In addition, an end piece is applied to an end portion of the rear door belt molding 120, causing a rise in the number of parts and an increase in cost.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a variable belt molding structure for a vehicle door configured for improving an appearance of the vehicle door by eliminating matching failure between moldings, improving sealing performance, and reducing the number of components, weight, and cost of the assembly.

Various aspects of the present invention are directed to providing a variable belt molding structure for a vehicle door, including: a skin disposed in a fixed quarter window and a rear door window wherein the skin is formed in a rear door of a vehicle and configured to have a width that is varied in a longitudinal direction; a carrier portion internally coupled to the skin configured to maintain air-tightness by being in contact with a window glass of the rear door window; a clip mounted to be internally coupled to the carrier portion and mounted in a door panel of the rear door; and a mounting clip coupled to a fixed quarter window bracket attached to the fixed quarter window.

The skin may include: a first skin extension configured to extend downward in a height direction of the vehicle; and a second skin extension integrally formed with the first skin extension to extend in a horizontal direction or a horizontal and upward direction thereof.

One or more coupling protrusions that protrude may be formed in internal surfaces of the first skin extension and the second skin extension of the skin, and one or more coupling grooves into which the coupling protrusions are inserted to be coupled may be formed in the carrier portion.

The carrier portion may include: a carrier body formed in the coupling groove; one or more sealing ribs integrally formed in the carrier body to maintain air-tightness by being in contact with the window glass; and a rigid member inserted into the carrier body to be integrally formed therewith.

The clip may be formed in an inverted 'U'-shape having a downwardly opened engagement groove.

One end portion of the rigid member may be engaged with an end portion of the clip.

A first width in which the skin is positioned in the fixed quarter window may be greater than a second width in which the skin is positioned in the rear door window.

A flange may be formed on the second skin extension of the skin to protrude downward in a height direction of the vehicle, and the mounting clip may be disposed in the flange.

A cushion member may be coupled to an internal surface of the skin.

The cushion member may be attached to the skin and the door panel using a double-sided adhesive tape.

A flange may be formed in the first skin extension of the skin, a mounting clip is mounted in the flange, and the mounting clip may be coupled to the fixed quarter window bracket.

According to the exemplary embodiment of the present invention, with a vehicle door variable belt molding structure matching failure between moldings can be essentially eliminated by applying a variable molding portion having a variable width while integrating a rear door window molding portion and a fixed quarter window molding section, improving an appearance of the rear door.

Further, since it is not necessary to apply the conventional end portion piece, it is possible to reduce the number of components, weight, and cost of the assembly.

In addition, it is possible to not only increase a degree of freedom of the sealing rib integrally combined the variable molding, but also to improve sealing performance thereof.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
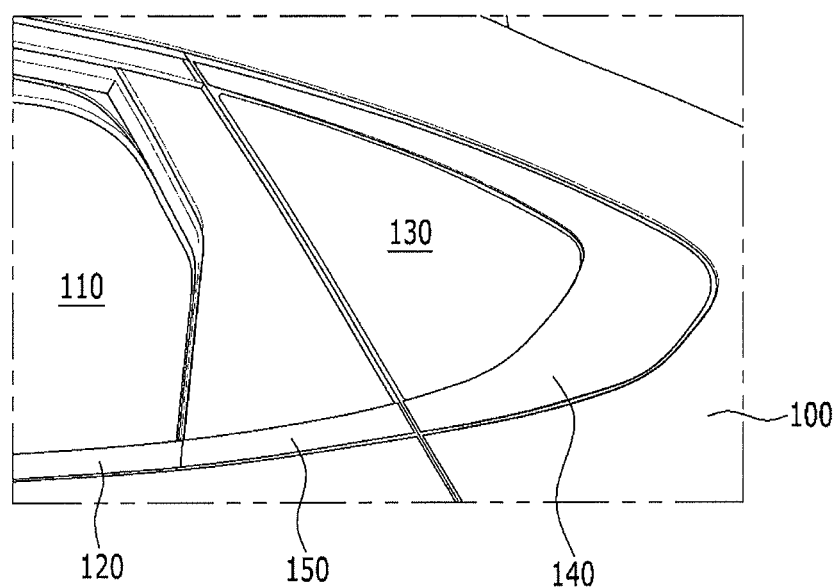
FIG. 1 is a partial cutaway side view illustrating a rear door of a vehicle obtained by applying a belt molding to the prior art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
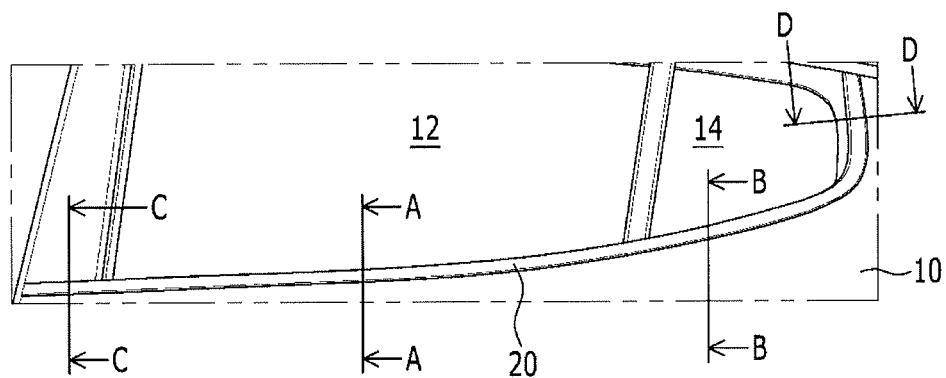
FIG. 2 is a partial cutaway side view illustrating a rear door obtained by applying a variable belt molding structure for a vehicle door thereto according to an exemplary embodiment of the present invention.

Referring to FIG. 2, according to an exemplary embodiment of the present invention, a rear door 10 achieved by applying a variable belt molding structure for a vehicle door thereto includes a rear door window 12 that can open or close an inside of the vehicle, and a fixed quarter window 14 which cannot be opened disposed in the rear in a longitudinal direction of the vehicle with respect to the rear door window 12.

In the exemplary embodiment of the present invention, a door variable belt molding 20 is coupled thereto along frames of the rear door window 12 and the fixed quarter window 14.

The door variable belt molding 20 is a variable molding having a width that can be varied along a longitudinal direction thereof.

Figure 3:
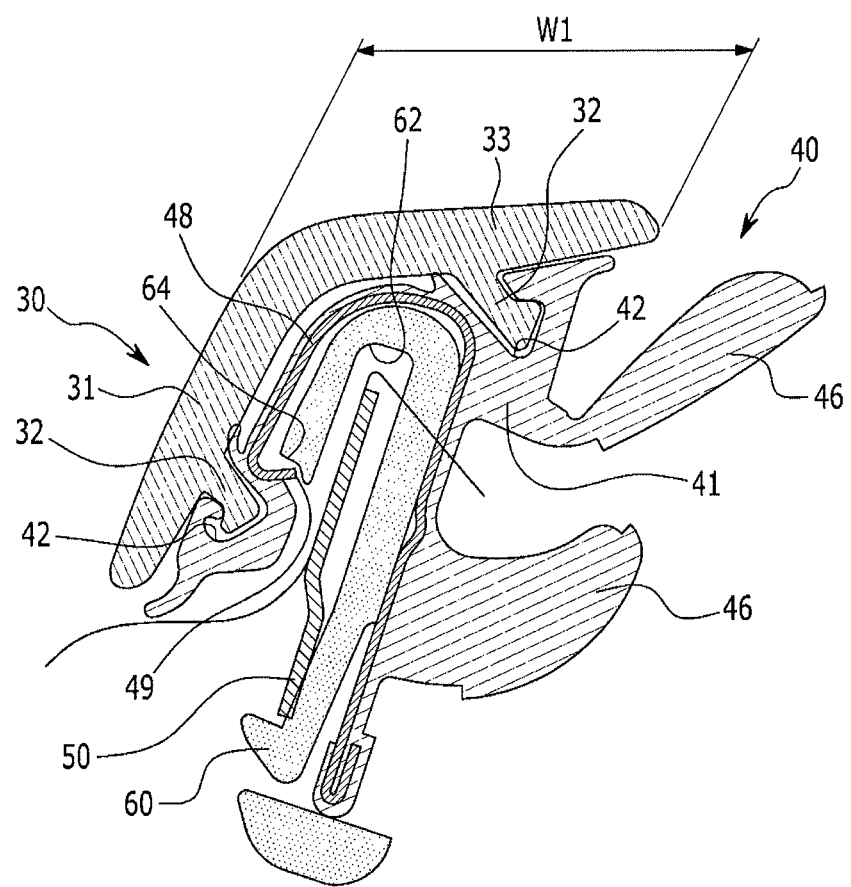
FIG. 3 is a cross-sectional view taken along a line A-A of FIG. 2.

As illustrated in FIG. 3, the door variable belt molding 20 mounted in the frame of the rear door window 12 may include: a skin 30 externally disposed to have a width that is varied along the longitudinal direction; a carrier portion 40 internally coupled to the skin 30 to maintain air-tightness by being in contact with a window glass; and a clip 60 internally coupled to the carrier portion 40 and mounted in a door panel 50.

The skin 30 may be molded by injection with a plastic material, for example.

The skin 30 may have a structure in which a first skin extension 31 that extends downwardly in a height direction of the vehicle and a second skin extension 33 that extends in a horizontal direction, or in a horizontal and upward direction thereof, are integrally formed.

One or more coupling protrusions 32 are formed in an internal surface of each of the first skin extension 31 and the second skin extension 33, and one or more coupling grooves 42 into which the coupling protrusions 32 are inserted to be coupled are formed in the carrier portion 40. Accordingly, the skin 30 and the carrier portion 40 may be detachably coupled to each other through the coupling protrusions 32 and the coupling grooves 42.

The carrier portion 40 may include a carrier body 41 in which the coupling grooves 42 are formed, and one or more sealing ribs 46 integrally formed in the carrier body 41 to maintain air-tightness by being in contact with the window glass.

The carrier body 41 may include a high-hardness solid rubber material to increase a coupling force with the skin 30.

The sealing ribs 46 may include a soft rubber material to maintain appropriate elasticity.

A rigid member 48 may be inserted into the carrier body 41 to be integrally formed with the carrier body 41.

The rigid member 48 may be formed of stainless steel (SUS) or a metal material having appropriate rigidity.

The clip 60 may have a shape and rigidity that are sufficient to be fitted into the door panel 50 to be mounted therein.

The clip 60 can be formed with an inverted 'U'-shape having a downwardly opened engagement groove 62.

An end portion 49 of the rigid member 48 may be engaged with an end portion 64 of the clip 60.

Meanwhile, the door variable belt molding 20 coupled to a frame of the fixed quarter window 14 has a structure that is slightly different from that of the door belt molding mounted in the frame of the rear door window 12.

Figure 4:
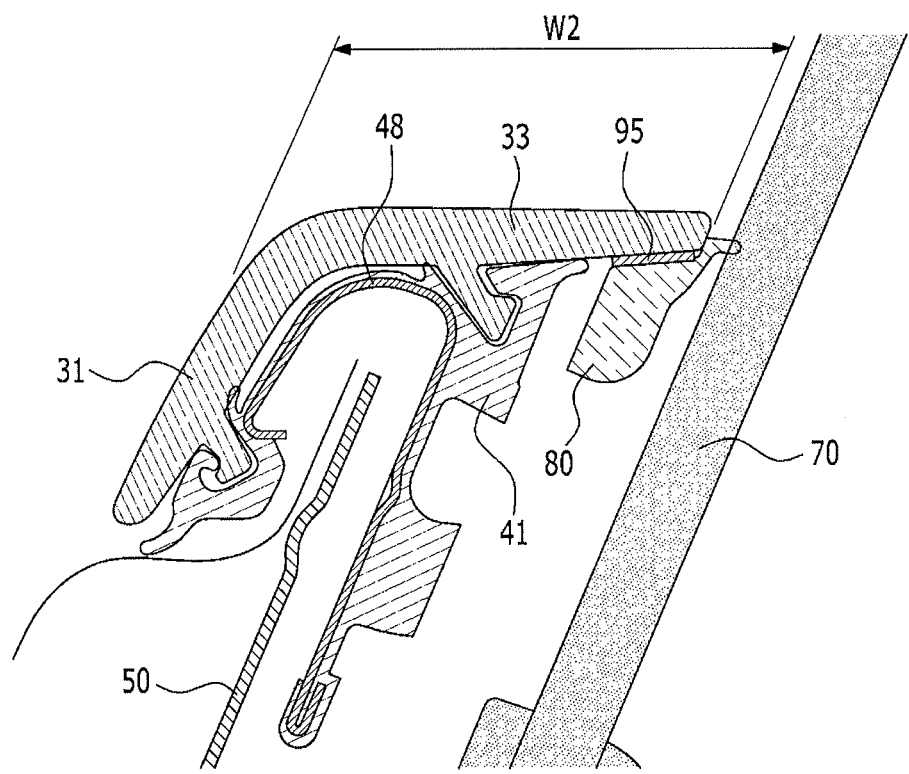
FIG. 4 is a cross-sectional view taken along a line B-B of FIG. 2.

In other words, as shown in FIG. 4, the fixed quarter window glass is fixedly disposed in the rear door 10 instead of moving vertically, and thus the sealing rib 46 is omitted.

In addition, the skin 30 and the carrier portion 40 may be attached to a fixed quarter window bracket 70 using a double-sided adhesive tape without being mounted in the quarter door panel 50 through the clip 60.

For example, a cushion member 80 may be attached to an internal surface of the skin 30 using a double-sided adhesive tape 95, and the cushion member 80 may be attached to the fixed quarter window bracket 70 by use of the double-sided adhesive tape 95. (See FIG. 5 and FIG. 6)

The cushion member 80 may include a thermoplastic elastomer (TPE) material.

When the skin 30 is disposed above the fixed quarter window 14, the skin 30 may be formed to have a variable width.

The variable width of the skin 30 may be gradually increased along a longitudinal direction of the vehicle toward the rear.

In other words, a width W2 of the second skin extension 33 of the skin 30 may be greater than a first width W1 of the second skin extension 33 illustrated in FIG. 3.

Figure 5:
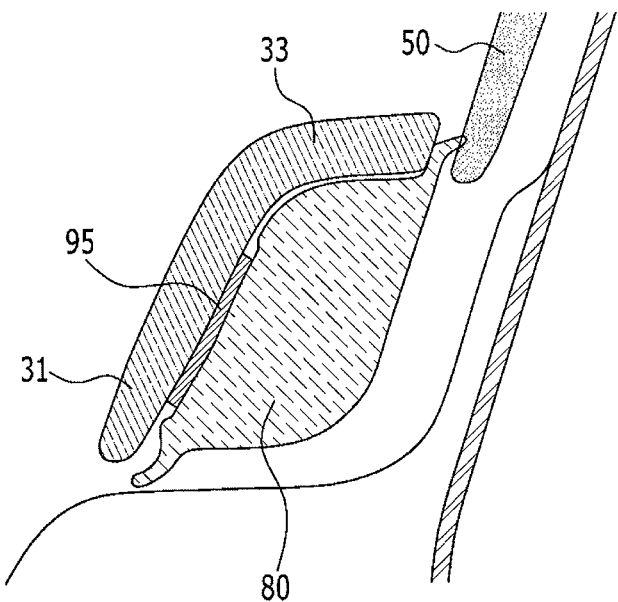
FIG. 5 is a cross-sectional view taken along a line C-C of FIG. 2.
Figure 5:
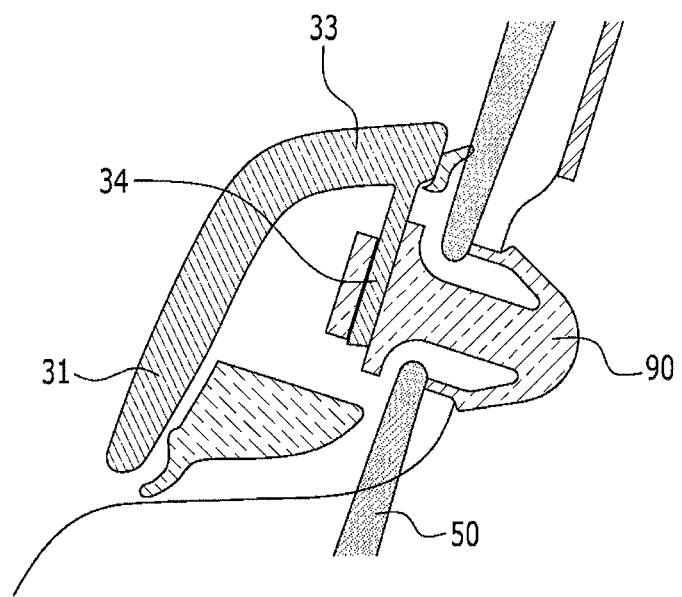

Referring to FIG. 5, a flange 34 may be formed in the second skin extension 33 of the skin 30 to protrude downward in the height direction of the vehicle, and a mounting clip 90 may be disposed in the flange 34.

For example, an assembly hole may be disposed in the flange 34, and an end portion of the mounting clip 90 may be fitted into the assembly hole.

The mounting clip 90 is configured to fix the skin 30 to the door panel 50.

The cushion member 80 may be attached to the first skin extension 31 using the double-sided adhesive tape 95 in a portion where the mounting clip 90 is not provided.

Figure 6:
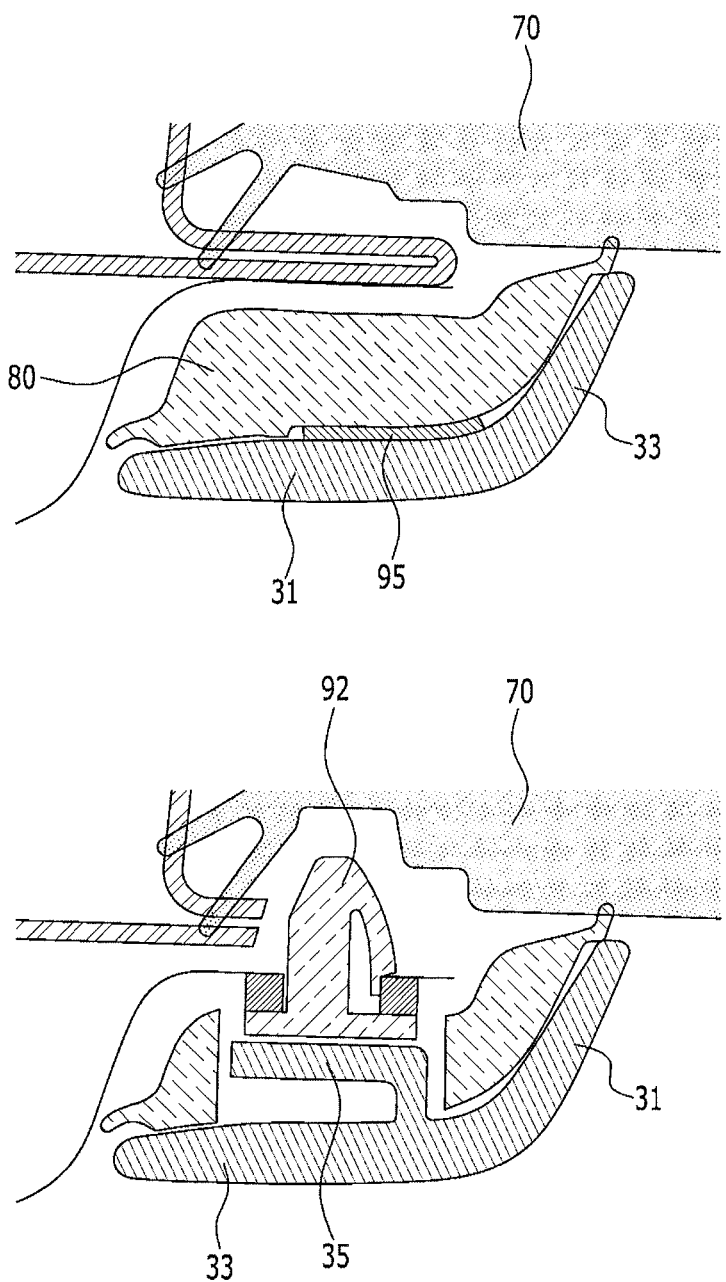
FIG. 6 is a cross-sectional view taken along a line D-D of FIG. 2.

Referring to FIG. 6, a flange 35 may be formed in the first skin extension 31 of the skin 30, a mounting clip 92 may be mounted in the flange 35, and the mounting clip 92 may be coupled to the fixed quarter window bracket 70.

The cushion member 80 may be attached to the first skin extension 31 using the double-sided adhesive tape 95 in a portion where the mounting clip 92 is not provided.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable belt molding structure for a vehicle door, the variable belt molding structure comprising:
    a skin disposed in a fixed quarter window and a rear door window formed in a rear door of a vehicle to have a width that is varied in a longitudinal direction thereof;
    a carrier portion internally coupled to the skin to maintain air-tightness by being in contact with a window glass of the rear door window;
    a clip mounted to be internally coupled to the carrier portion and mounted in a door panel of the rear door; and
    a first mounting clip coupled to a fixed quarter window bracket attached to the fixed quarter window,
    wherein the skin includes:
        a first skin extension configured to extend downward in a height direction of the vehicle; and
        a second skin extension integrally formed with the first skin extension to extend in a horizontal direction thereof or a horizontal and upward direction thereof, and
    wherein a first flange is formed in the second skin extension of the skin to protrude downward in the height direction of the vehicle, and the first mounting clip is disposed in the first flange.

2. The variable belt molding structure of claim 1, wherein one or more coupling protrusions are formed in internal surfaces of the first skin extension and the second skin extension of the skin, and
    one or more coupling grooves into which the coupling protrusions are inserted to be coupled are formed in the carrier portion.

3. The variable belt molding structure of claim 2, wherein the carrier portion includes:
    a carrier body formed in the one or more coupling grooves;
    one or more sealing ribs integrally formed in the carrier body to maintain air-tightness by being in contact with the window glass; and
    a rigid member inserted into the carrier body to be integrally formed therewith.

4. The variable belt molding structure of claim 1, wherein the clip is formed in an inverted 'U'-shape having a downwardly opened engagement groove.

5. The variable belt molding structure of claim 3, wherein an end portion of the rigid member is engaged with an end portion of the clip.

6. The variable belt molding structure of claim 1, wherein a first width in which the skin is disposed in the fixed quarter window is greater than a second width in which the skin is disposed in the rear door window.

7. The variable belt molding structure of claim 1, wherein a cushion member is coupled to an internal surface of the skin.

8. The variable belt molding structure of claim 7, wherein the cushion member is attached to the skin and the door panel by use of a double-sided adhesive tape.

9. The variable belt molding structure of claim 1, wherein a second flange is formed in the first skin extension of the skin, a second mounting clip is mounted in the second flange, and the second mounting clip is coupled to the fixed quarter window bracket.

* * * * *